United States Patent
Newham et al.

(10) Patent No.: US 9,131,332 B2
(45) Date of Patent: Sep. 8, 2015

(54) METHOD OF PROVIDING CALL CONTROL INFORMATION FROM A MOBILE PHONE TO A PERIPHERAL DEVICE

(75) Inventors: Adam E. Newham, Poway, CA (US); Brian F. Miller, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 13/608,629

(22) Filed: Sep. 10, 2012

(65) Prior Publication Data

US 2014/0073256 A1 Mar. 13, 2014

(51) Int. Cl.
*H04B 7/00* (2006.01)
*H04M 1/00* (2006.01)
*H04W 4/00* (2009.01)
*H04W 4/20* (2009.01)
*H04M 1/60* (2006.01)
*H04M 1/725* (2006.01)
*H04W 84/18* (2009.01)

(52) U.S. Cl.
CPC .............. *H04W 4/008* (2013.01); *H04W 4/20* (2013.01); *H04M 1/6066* (2013.01); *H04M 1/7253* (2013.01); *H04W 84/18* (2013.01)

(58) Field of Classification Search
USPC ............ 455/41.1, 41.2, 41.3, 66.1, 566, 567, 455/569.1
See application file for complete search history.

(56) References Cited

U.S. PATENT DOCUMENTS

| | | | |
|---|---|---|---|
| 6,272,359 B1 * | 8/2001 | Kivela et al. ................. | 455/567 |
| 7,515,937 B2 | 4/2009 | Lee | |
| 7,558,529 B2 * | 7/2009 | Seshadri et al. ............. | 455/41.2 |
| 7,996,496 B2 | 8/2011 | Haartsen et al. | |
| 7,996,571 B2 | 8/2011 | Salokannel | |
| 8,055,307 B2 | 11/2011 | Rahman et al. | |
| 2002/0115478 A1 | 8/2002 | Fujisawa et al. | |
| 2004/0058647 A1 | 3/2004 | Zhang et al. | |
| 2007/0140187 A1 | 6/2007 | Rokusek et al. | |
| 2009/0248913 A1 | 10/2009 | Salokannel | |
| 2010/0203830 A1 | 8/2010 | Warren et al. | |
| 2010/0240345 A1 | 9/2010 | Karrman et al. | |
| 2011/0032071 A1 | 2/2011 | Tondering | |
| 2011/0059769 A1 | 3/2011 | Brunolli | |
| 2011/0217930 A1 * | 9/2011 | Jones et al. .................. | 455/41.2 |
| 2012/0044062 A1 | 2/2012 | Jersa et al. | |

FOREIGN PATENT DOCUMENTS

WO  WO-2009109191 A1  9/2009

OTHER PUBLICATIONS

Bluetooth Doc: "Hands-Free Profile 1.6", May 10, 2011, pp. 1-126, XP055075631.
International Search Report and Written Opinion—PCT/US2013/058277—ISA/EPO—Feb. 24, 2014.

* cited by examiner

*Primary Examiner* — Nguyen Vo
(74) *Attorney, Agent, or Firm* — Ryan N. Farr

(57) ABSTRACT

The systems, methods, and devices of the various embodiments provide call control information from a mobile phone to another device by moving the functionality enabling the separation of call control commands from audio data off the mobile phone. The various embodiments handle the separation of call control commands from audio data at an ear piece or other peripheral device, such as a personal hub, which is part of a multiple subscriber device system. The various embodiments enable the standard Bluetooth® Hands-Free Profile to be used by a multiple subscriber device system to interact with a mobile phone.

63 Claims, 11 Drawing Sheets

METHOD OF PROVIDING CALL CONTROL INFORMATION FROM A MOBILE PHONE TO A PERIPHERAL DEVICE

BACKGROUND

Mobile phones offer significant capabilities of interest to users, but a user must physically interact with the mobile phone to navigate menus, make calls, or listen to messages. This physical interaction may be distracting, cumbersome, and intrusive. To reduce the need for physical interaction, an additional wireless device, such as an ear piece or other peripheral device (e.g., a personal hub), may be linked with the mobile phone, such as via a Bluetooth® link. The ear piece or other peripheral device may be configured to exchange audio data and call control information (e.g., attention ("AT") commands) with the mobile phone. In this manner, the ability of a user to control the operation of the mobile phone via the ear piece or other peripheral device may reduce the distraction, intrusiveness, and burden associated with physical interaction with the mobile phone.

However, mobile phones using the standard Bluetooth® Hands-Free Profile (i.e., Hands-Free Profile 1.6 specification published by the Bluetooth® Special Interest Group, May 10, 2011, available at www.bluetooth.org/Technical/Specifications/adopted.htm, herein incorporated by reference in its entirety) can only support a single subscriber device using the Hands-Free Profile at one time. The standard Bluetooth® Hands-Free Profile will not allow a mobile phone to exchange audio data with a first communication device and call control commands with a second communication device. Only one Hands-Free Profile device may be connected to the mobile phone at a time to exchange call control commands and/or audio data. Therefore, without additional modifications (e.g., additional software on the mobile phone), mobile phones using the standard Bluetooth® Hands-Free Profile cannot support multiple subscriber device systems (i.e., personal hub systems including a personal hub and at least one ear piece).

Previous multiple subscriber device systems have required additional software resident on the mobile phone to convey information to the second communication device using out of band signaling (i.e., non-Bluetooth® Hands-Free Profile established links). While potentially a solution to the limitations of the Bluetooth® Hands-Free Profile, the software based out of band signaling approach requires software to be developed for each phone platform (e.g., Android®, iOS®, RIM®, etc) at significant cost. Additionally, changes, such as updates, to the operating system of a platform may alter the call handling on the platform and require additional modifications to the out of band signaling software. To ensure functionality, multiple versions of the out of band signaling software may be needed for each platform.

SUMMARY

The systems, methods, and devices of the various embodiments provide call control information from a mobile phone to another device by moving the functionality enabling the separation of call control commands from audio data off the mobile phone. The various embodiments handle the separation of call control commands from audio data at an ear piece or other peripheral device, such as a personal hub, which is part of a multiple subscriber device system. The various embodiments enable the standard Bluetooth® Hands-Free Profile to be used by a multiple subscriber device system to interact with a mobile phone.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
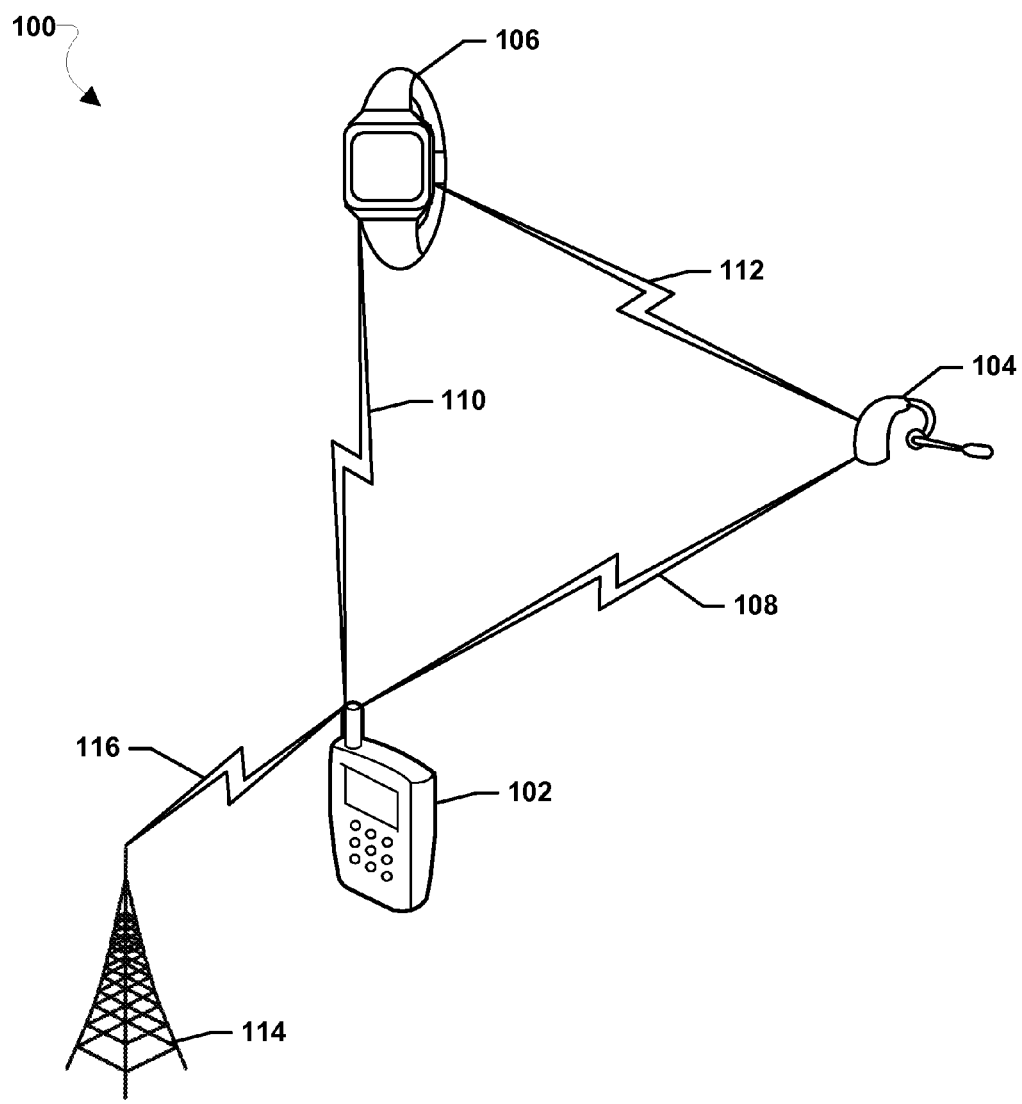
FIG. 1 is a communication system block diagram of a multiple subscriber device system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device," "mobile phone," and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for receiving phone calls, sending and receiving audio data, and sending and receiving call control commands.

As used herein, the term "personal hub" is used herein to refer to any device that may be worn or carried by a user and may interact with a variety of mobile devices and/or earpieces. In an embodiment, a personal hub may be configured to be worn by a user around the user's wrist in a manner similar to that of a wrist watch. In alternative embodiments, a personal hub may be a badge, tag, bracelet, patch, belt buckle, medallion, pen, key chain, or any other device worn or carried by a user. In an embodiment, a personal hub may wirelessly communicate with a user's mobile device(s), such as a smart phone, and a wireless earpiece worn by the user. The personal hub may wirelessly communicate with the user's mobile device(s) to enable the user to operate the user's mobile device(s) remotely. In an embodiment, a personal hub system may be a multi-subscriber device system including a personal hub and one or two wireless earpieces worn by the user, together enabling a personal hub system user to utilize a user's mobile device(s) remotely.

Mobile phones offer significant capabilities of interest to users, but a user must physically interact with the mobile phone to navigate menus, make calls, or listen to messages. This physical interaction may be distracting, cumbersome, and intrusive. To reduce the need for physical interaction, an additional wireless device, such as an ear piece or other peripheral device (e.g., a personal hub), may be linked with the mobile phone, such as via a Bluetooth® link. The ear piece or other peripheral device may be configured to exchange audio data and call control information (e.g., attention ("AT") commands) with the mobile phone. In this manner, the ability of a user to control the operation of the mobile phone via the ear piece or other peripheral device may reduce the distraction, intrusiveness, and burden associated with physical interaction with the mobile phone.

However, mobile phones using the standard Bluetooth® Hands-Free Profile (i.e., Hands-Free Profile 1.6 specification published by the Bluetooth® Special Interest Group, herein incorporated by reference in its entirety) can only support a single subscriber device using the Hands-Free Profile at one time. The standard Bluetooth® Hands-Free Profile will not allow a mobile phone to exchange audio data with a first communication device and call control commands with a second communication device. Only one Hands-Free Profile device may be connected to the mobile phone at a time to exchange call control commands and/or audio data. Therefore, without additional modifications (e.g., additional software on the mobile phone), mobile phones using the standard Bluetooth® Hands-Free Profile cannot support multiple subscriber device systems (i.e., personal hub systems including a personal hub and at least one ear piece).

Previous multiple subscriber device systems, such as the personal hub system described in U.S. Pat. No. 7,996,571, have required additional software resident on the mobile phone to convey information to the second communication device using out of band signaling (i.e., non-Bluetooth® Hands-Free Profile established links). The personal hub system described in U.S. Pat. No. 7,996,571 uses physical layer applications and software/hardware on the mobile device, such as the admission controller 312 and dual-mode manager 314, to separate call control commands from call audio. See e.g., col. 8, line 26 through col. 9, line 30; col. 12, lines 28 through col. 13, line 25; and FIG. 7.

While potentially a solution to the limitations of the Bluetooth® Hands-Free Profile, the software based out of band signaling approach requires software to be developed for each phone platform (e.g., Android®, iOS®, RIM®, etc) at significant cost. Additionally, changes, such as updates, to the operating system of a platform may alter the call handling on the platform and require additional modifications to the out of band signaling software. To ensure functionality, multiple versions of the out of band signaling software may be needed for each platform.

The systems, methods, and devices of the various embodiments leverage the existing capabilities of the standard Bluetooth® Hands-Free Profile without requiring additional software to interact with the mobile phone's call handling system to manage calls on the mobile phone. The various embodiments solve the problems with developing and updating software for multiple subscriber device system (e.g., personal hub system including a personal hub and at least one ear piece) for each mobile phone platform. The various embodiments move the functionality enabling the separation of call control commands from audio data off the mobile phone. The various embodiments handle separation of call control commands from audio data at an ear piece or other peripheral device, such as a personal hub, which is part of the multiple subscriber device system. In this manner, the various embodiments enable the standard Bluetooth® Hands-Free Profile to be used by a multiple subscriber device system to interact with the mobile phone, rather than requiring additional software to be downloaded to the mobile phone.

In overview, the various embodiments manage calls by providing call control information from a mobile phone to a peripheral device (e.g., a personal hub) by establishing a first Bluetooth® link with a first communication device (e.g., an ear piece). As used herein, "call control information" means that data which is carried over AT commands and responses in the Service Level Connection of the Bluetooth® HandsFree Profile, and includes but is not limited to, answering and placing calls, call termination, incoming call alerts including Calling Line Identification, and status information related to call setup and call progress. In an embodiment, the mobile phone and first communication device may exchange call control commands and audio data over the first Bluetooth® link. The first communication device may establish a separate second Bluetooth® link with the peripheral device, and the first communication device and the peripheral device may exchange call control commands over the second Bluetooth® link. In this manner, the single link supported in the standard Bluetooth® Hands-Free Profile may enable the exchange of call control commands between the mobile phone, first communication device, and peripheral device enabling the peripheral device to control call establishment on the mobile phone.

In an embodiment, a first standard Bluetooth® link as defined by the Bluetooth® Hands-Free Profile, including both a service level connection (i.e., a call control connection) for exchanging call control commands and an audio connection for exchanging audio data, may be established between a mobile phone and an ear piece. As used herein, an "out of band link" is used to refer to a radio link not established according to the Bluetooth® Hands-Free Profile. In an embodiment, an out of band link (e.g., a separate Bluetooth® link, Peanut, Wi-Fi, ANT+, etc. not established according to the Bluetooth® Hands-Free Profile) may be established between the ear piece and a peripheral device (e.g., personal hub). Call control commands may be sent from the mobile phone to the ear piece via the service level connection over the first Bluetooth® link. The ear piece may receive the call control commands and relay them to the peripheral device via the out of band link. The peripheral device may take an action based on the call control commands and/or generate its own call control commands. Call control commands generated by the peripheral device (e.g., an answer command) may be sent to the ear piece via the out of band link. The ear piece may receive the call control commands and relay them to the mobile phone via the service level connection over the first Bluetooth® link. Audio data may be exchanged between the mobile phone and the ear piece via the audio connection over the first Bluetooth® link, but the audio data may not be relayed to the peripheral device. In this manner, the ear piece may handle audio data independent of call control commands. In a further embodiment, the peripheral device may also establish a second out of band link (e.g., Bluetooth® SPP, Wi-Fi, etc.) with the mobile phone to request and/or receive phone book information from the mobile phone and/or phone book information from the mobile phone may be requested and/or received via the Bluetooth® Phone Book Access Profile if available/supported by the mobile phone.

In another embodiment, a first standard Bluetooth® link as defined by the Bluetooth® Hands-Free Profile, including both a service level connection (i.e., a call control connection) for exchanging call control commands and an audio connection for exchanging audio data, may be established between a mobile phone and an ear piece. A first out of band link (e.g., a separate Bluetooth® link, Peanut, WiFi, ANT+, etc. not established according to the Bluetooth® Hands-Free Profile) may be established between the ear piece and the mobile phone. The mobile phone may run a relay application which may establish a second out of band link (e.g., a separate Bluetooth® link, Peanut, Wi-Fi, ANT+, etc. not established according to the Bluetooth® Hands-Free Profile) between the mobile phone and a peripheral device. Call control commands may be sent from the mobile phone to the ear piece via the service level connection over the first Bluetooth® link. The ear piece may receive the call control commands and relay them back to the relay application on the mobile phone via the first out of band link. The relay application may receive the call control commands and send them to the peripheral device via the second out of band link. The peripheral device may take an action based on the call control commands and/or generate its own call control commands. Call control commands generated by the peripheral device (e.g., an answer command) may be sent to the relay application on the mobile phone via the second out of band link. The relay application may receive the call control commands and send them to the ear piece via the first out of band link. The ear piece may receive the call control commands and relay them to the mobile phone via the service level connection over the first Bluetooth® link. Audio data may be exchanged between the mobile phone and the ear piece via the audio connection over the first Bluetooth® link, but the audio data may not be relayed to the mobile phone via the first out of band link. In this manner, the ear piece may handle audio data independent of call control commands. Additionally, even though a relay application may be present on the mobile device, the relay application need only interact with the ear piece and peripheral device via the out of band links. Thus the relay application does not need to interact with the Bluetooth® Hands-Free Profile or other call handling systems on the mobile phone. In this manner, the relay application may not need to be tailored to each mobile phone platform and/or call handling system.

In an embodiment, a first standard Bluetooth® link as defined by the Bluetooth® Hands-Free Profile, including both a service level connection (i.e., a call control connection) for exchanging call control commands and an audio connection for exchanging audio data, may be established between a mobile phone and a peripheral device. In this manner, the peripheral device may be registered with the mobile device according to the Bluetooth® Hands-Free Profile as a hands free device. A second standard Bluetooth® link as defined by the Bluetooth® Hands-Free Profile, including both a service level connection (i.e., a call control connection) for exchanging call control commands and an audio connection for exchanging audio data, may be established between the peripheral device and the ear piece. In this manner, the ear piece may be registered with the peripheral device according to the Bluetooth® Hands-Free Profile as a hands free device. The registration of the ear piece with the peripheral device via the Bluetooth® Hands-Free Profile may enable any Bluetooth® enabled ear piece to be used with the multiple subscriber device system. The peripheral device may be configured to act on and/or generate call control commands, and the peripheral device may relay audio data and/or call control commands between the mobile phone and ear piece as well. In an embodiment, the peripheral device may modify the call control commands received from the mobile phone before relaying the modified call control commands to the ear piece. In an embodiment, the peripheral device may receive call control commands from the ear piece and may validate the call control commands generated by the peripheral device and/or received from the ear piece prior to sending the call control commands generated by the peripheral device and/or received from the ear piece to the mobile phone. In an embodiment, validating call control commands may include comparing generated and/or received call control commands to previously sent call control commands to ensure duplicate or conflicting call control commands are not sent to the mobile phone.

FIG. 1 illustrates a multiple subscriber device system 100 suitable for use with the various embodiments. The multiple subscriber device system 100 may include multiple devices, such as a mobile phone 102, a wireless earpiece 104, and a peripheral device 106, such as a personal hub. The mobile phone 102 may exchange information, such as call control commands and audio data, with a cellular network 114 over a cellular connection 116, including CDMA, TDMA, GSM, PCS, 3G, 4G, LTE, or any other type connection, to establish voice calls over the cellular network 114. The mobile phone 102 and ear piece 104 may exchange data via one or more radio links 108. As an example, the one or more radio links 108 between the mobile phone 102 and the ear piece 104 may be one or more Bluetooth® connections, one or more Peanut connections, one or more Wi-Fi connections, one or more ANT+ connections, and/or one or more of any other type radio connections. The mobile phone 102 and the peripheral device 106 may exchange data via one or more radio links 110. As an example, the one or more radio links 110 between the mobile phone 102 and the peripheral device 106 may be one or more Bluetooth® connections, one or more Peanut connections, one or more Wi-Fi connections, one or more ANT+ connections, and/or one or more of any other type radio connections. The ear piece 104 and the peripheral device 106 may exchange data via one or more radio links 112. As an example, the one or more radio links 112 between the ear piece 104 and the peripheral device 106 may be one or more Bluetooth® connections, one or more Peanut connections, one or more Wi-Fi connections, one or more ANT+ connections, and/or one or more of any other type radio connections.

Figure 2:
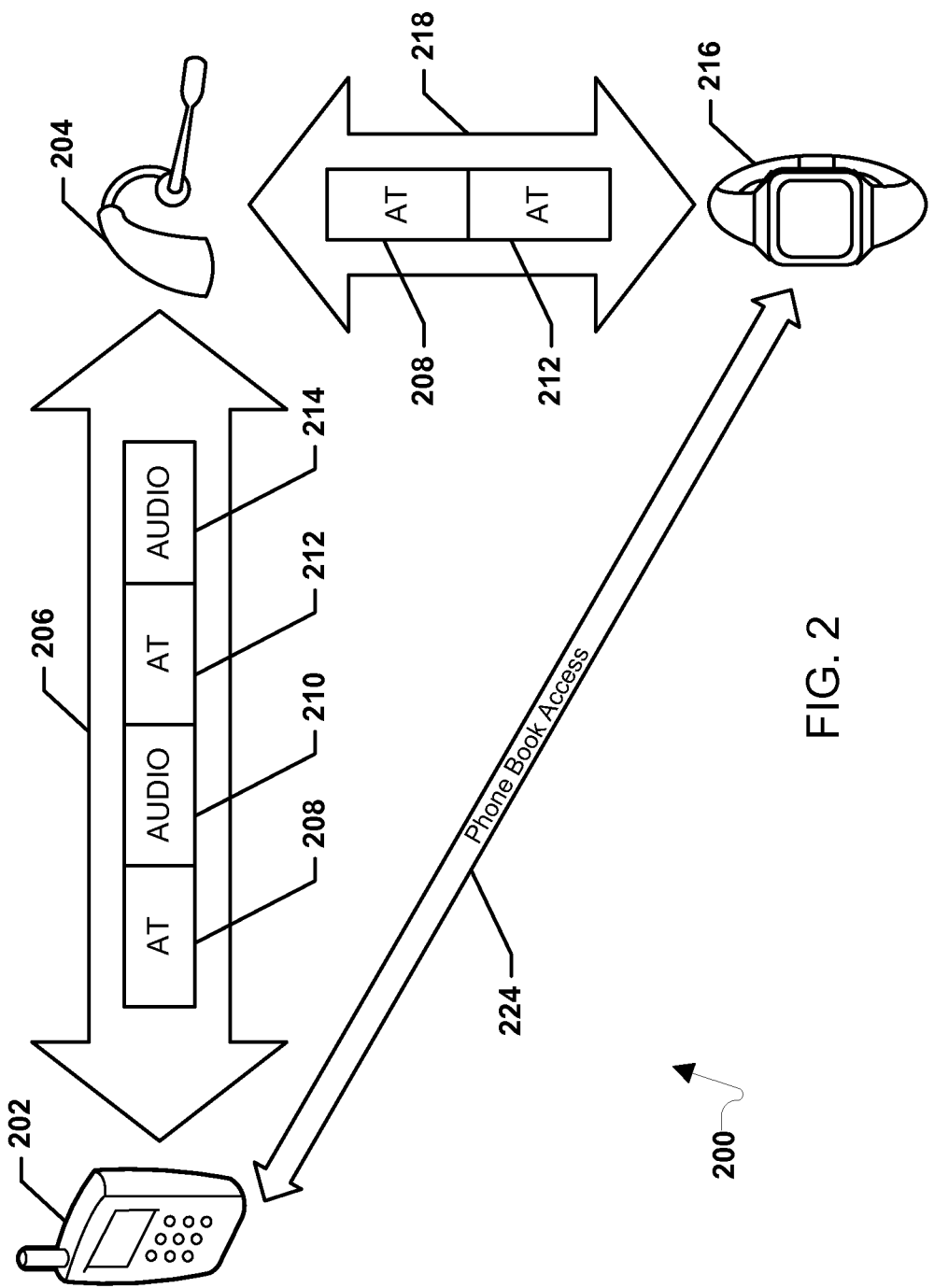
FIG. 2 is a communication flow diagram illustrating radio link exchanges in a multiple subscriber device system according to an embodiment.

FIG. 2 is a communication flow diagram illustrating example radio link exchanges in a multiple subscriber device system 200 including a mobile phone 202, ear piece 204, and peripheral device 216. In an embodiment, the mobile phone 202 and ear piece 204 may establish a first radio link 206 for exchanging call control commands, such as AT command packets 208, 212, and audio data, such as audio data packets 210, 214. In an embodiment, the first radio link 206 may be a standard Bluetooth® link as defined by the Bluetooth® Hands-Free Profile, including both a call control (i.e., service) connection for exchanging call control commands, such as AT command packets 208, 212, and an audio connection for exchanging audio data, such as audio data packets 210, 214. In an embodiment, the AT command packets 208, 212 and the audio data packets 210, 214 may be multiplexed together over the first radio link 206. AT command packets 208, 212 and audio data packets 210, 214 may be sent from the mobile phone 202 to the ear piece 204 and/or sent from the ear piece 204 to the mobile phone 202.

In an embodiment, a first out of band link 218 may be established between the ear piece 204 and the peripheral device 216. As an example, the first out of band link 218 may be a radio link not established according to the Bluetooth® Hands-Free Profile, such as a separate Bluetooth® link, Peanut, Wi-Fi, ANT+, or other radio link not established according to the Bluetooth® Hands-Free Profile. In an embodiment, the ear piece 204 may receive the AT command packets 208, 212 and audio data packets 210, 214 from the mobile phone 202 and may separate the AT command packets 208, 212 from the audio data packets 210, 214. As an example, the ear piece 204 may separate call control commands from audio data by de-multiplex the AT command packets 208, 212 from the audio data packets 210, 214. In an embodiment, the ear piece 204 may consume the audio data packets 210, 214, for example, by utilizing the audio data packets 210, 214 to output audio on a speaker of the ear piece 204. The ear piece 204 may send the AT command packets 208, 212 received from the mobile phone 202 to the peripheral device 216 via the first out of band link 218. The peripheral device 216 may receive the AT command packets 208, 212 and may consume the AT command packets 208, 212, for example, by utilizing the AT command packets 208, 212 to indicate on a display of the peripheral device 316 that a voice call has been established.

In an embodiment, the peripheral device 216 may generate call control commands, such as AT command packets 208, 212. As an example call control commands generated by the peripheral device 216 may include a hang-up command corresponding to a user selection of an end call icon on a touch screen of the peripheral device 216. In an embodiment, the peripheral device 216 may send the peripheral device 216 originated call control commands, such as AT command packets 208, 212, to the ear piece 204 via the first out of band link 218. The ear piece 204 may receive the peripheral device 216 originated AT command packets 208, 212 and may send the peripheral device 216 originated AT command packets 208, 212 to the mobile phone 202 via the first radio link 206. As an example, the ear piece 204 may send the peripheral device 216 originated AT command packets 208, 212 to the mobile phone 202 via the first radio link 206 by multiplexing the peripheral device 216 originated AT command packets 208, 212 with ear piece originated audio data packets 210, 214 sent over the standard Bluetooth® link as defined by the Bluetooth® Hands-Free Profile. In an embodiment, a second out of band link 224 may be established between the mobile phone 202 and the peripheral device 216. As an example, the second out of band link 224 may be a radio link not established according to the Bluetooth® Hands-Free Profile, such as a separate Bluetooth® link, Peanut, Wi-Fi, ANT+, or other radio link not established according to the Bluetooth® Hands-Free Profile. As a specific example, the second out of band link 224 may be a Bluetooth® link established according to the Bluetooth® Phone Book Access Profile. In an embodiment, the second out of band link 224 may be used by the peripheral device to request and/or receive phonebook information from the mobile phone, such as phone numbers, contact information, call history information, etc.

Figure 3:
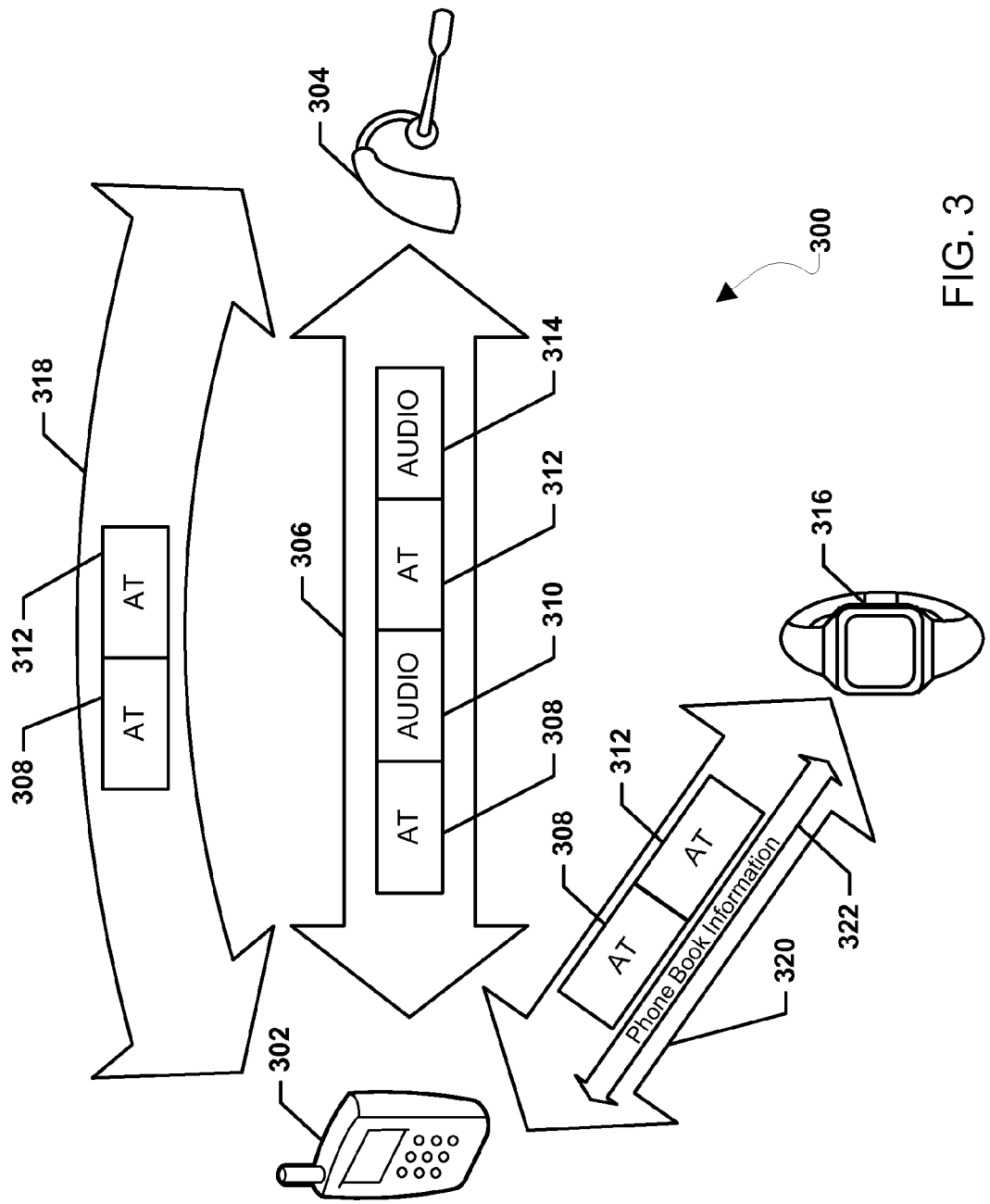
FIG. 3 is a communication flow diagram illustrating radio link exchanges in a multiple subscriber device system according to a second embodiment.

FIG. 3 is a communication flow diagram illustrating example radio link exchanges in a multiple subscriber device system 300 including a mobile phone 302, ear piece 304, and peripheral device 316. In an embodiment, the mobile phone 302 and ear piece 304 may establish a first radio link 306 for exchanging call control commands, such as AT command packets 308, 312, and audio data, such as audio data packets 310, 314. In an embodiment, the first radio link 306 may be a standard Bluetooth® link as defined by the Bluetooth® Hands-Free Profile, including both a call control (i.e., service) connection for exchanging call control commands, such as AT command packets 308, 312, and an audio connection for exchanging audio data, such as audio data packets 310, 314. In an embodiment, the AT command packets 308, 312 and the audio data packets 310, 314 may be multiplexed together over the first radio link 306. AT command packets 308, 312 and audio data packets 310, 314 may be sent from the mobile phone 302 to the ear piece 304 and/or sent from the ear piece 304 to the mobile phone 302.

In an embodiment, a first out of band link 318 may be established between the ear piece 304 and the mobile phone 302. As an example, the first out of band link 318 may be a radio link not established according to the Bluetooth® Hands-Free Profile, such as a separate Bluetooth® link, Peanut, Wi-Fi, ANT+, or other radio link not established according to the Bluetooth® Hands-Free Profile. In an embodiment, the ear piece 304 may receive the AT command packets 308, 312 and audio data packets 310, 314 from the mobile phone 302 and may separate the AT command packets 308, 312 from the audio data packets 310, 314. As an example, the ear piece 304 may separate call control commands from audio data by de-multiplex the AT command packets 308, 312 from the audio data packets 310, 314. In an embodiment, the ear piece 304 may consume the audio data packets 310, 314, for example, by utilizing the audio data packets 310, 314 to output audio on a speaker of the ear piece 304. The ear piece 304 may send the AT command packets 308, 312 received from the mobile phone 302 to the mobile phone 302 via the first out of band link 318. The mobile phone 302 may receive the AT command packets 308, 312 and may provide the AT command packets 308, 312 to a hub application resident on the mobile phone 302.

In an embodiment, a second out of band link 320 may be established between the mobile phone 302 and peripheral device 316. As an example, the second out of band link 320 may be a radio link not established according to the Bluetooth® Hands-Free Profile, such as a separate Bluetooth® link, Peanut, Wi-Fi, ANT+, or other radio link not established according to the Bluetooth® Hands-Free Profile. In an embodiment, the establishment of the second out of band link 320 may be initiated by the hub application resident on the mobile phone 302. In an embodiment, the hub application resident on the mobile phone 302 may receive the AT command packets 308, 312 originated on the mobile phone 302 via the first out of band link 318 and may send the AT command packets 308, 312 to the peripheral device 316 via the second out of band link 320. The peripheral device 316 may receive the AT command packets 308, 312 and may consume the AT command packets 308, 312, for example, by utilizing the AT command packets 308, 312 to indicate on a display of the peripheral device 316 that a voice call has been established. In a further embodiment, phonebook information 322 may also be sent from the mobile phone 302 to the peripheral device 316 over the second out of band link 320.

In an embodiment, the peripheral device 316 may generate call control commands, such as AT command packets 308, 312. As an example call control commands generated by the peripheral device 316 may include a hang-up command corresponding to a user selection of an end call icon on a touch screen of the peripheral device 316. In an embodiment, the peripheral device 316 may send the peripheral device 316 originated call control commands, such as AT command packets 308, 312, to the hub application resident on the mobile phone 302. The hub application resident on the mobile phone 302 may receive the peripheral device 316 originated call control commands, such as AT command packets 308, 312, and may send the call control commands to the ear piece 304 via the first out of band link 318. The ear piece 304 may receive the peripheral device 316 originated AT command packets 308, 312 and may send the peripheral device 316 originated AT command packets 308, 312 to the mobile phone 302 via the first radio link 206. As an example, the ear piece 304 may send the peripheral device 316 originated AT command packets 308, 312 to the mobile phone 302 via the first radio link 306 by multiplexing the peripheral device 316 originated AT command packets 308, 312 with ear piece originated audio data packets 310, 314 sent over the standard Bluetooth® link as defined by the Bluetooth® Hands-Free Profile.

Figure 4:
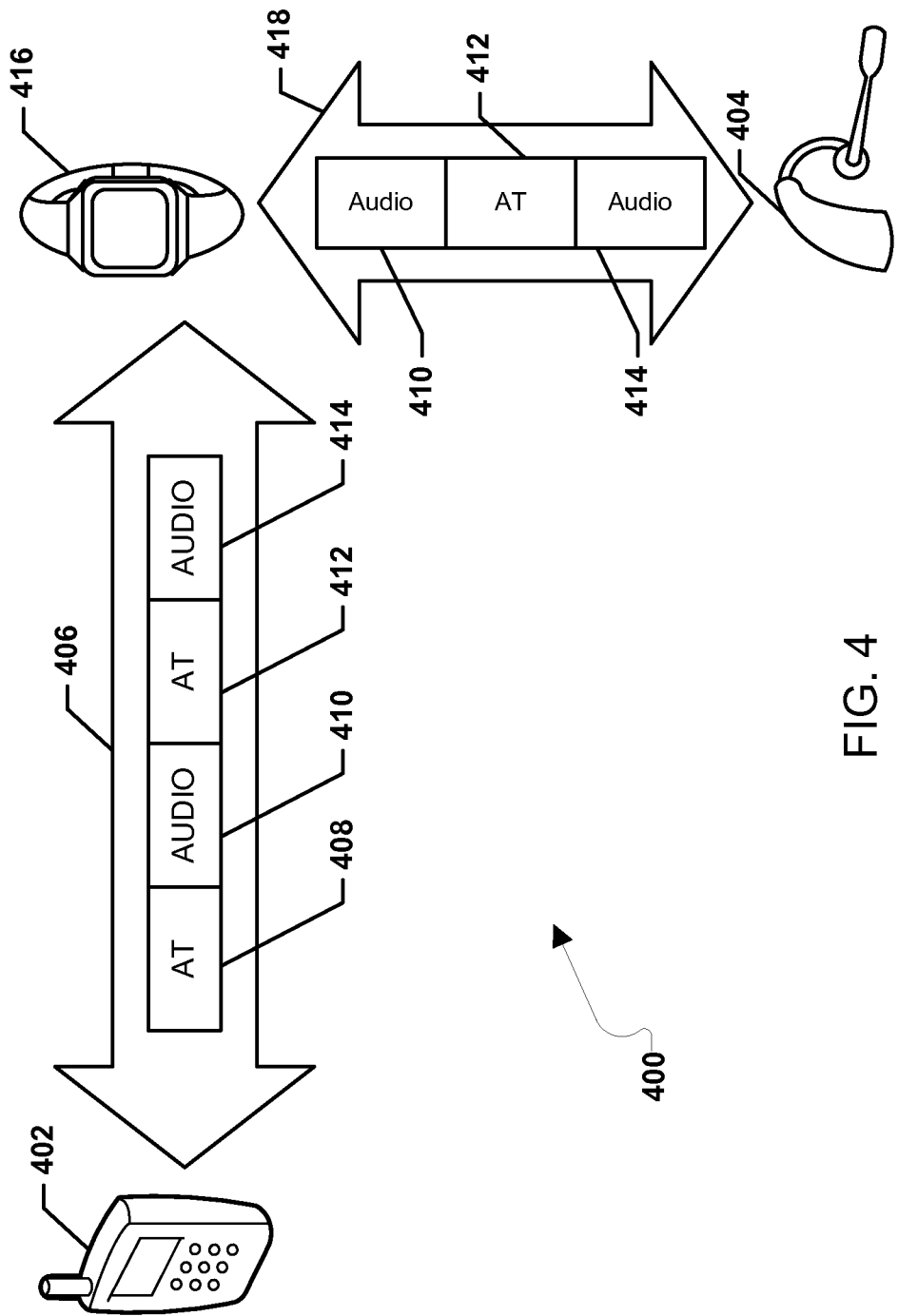
FIG. 4. is a communication flow diagram illustrating radio link exchanges in a multiple subscriber device system according to a third embodiment.

FIG. 4 is a communication flow diagram illustrating example radio link exchanges in a multiple subscriber device system 400 including a mobile phone 402, ear piece 404, and peripheral device 416. In an embodiment, the mobile phone 402 and peripheral device 416 may establish a first radio link 406 for exchanging call control commands, such as AT command packets 408, 412, and audio data, such as audio data packets 410, 414. In an embodiment, the first radio link 406 may be a standard Bluetooth® link as defined by the Bluetooth® Hands-Free Profile, including both a call control (i.e., service) connection for exchanging call control commands, such as AT command packets 408, 412, and an audio connection for exchanging audio data, such as audio data packets 410, 414. In an embodiment, the AT command packets 408, 412 and the audio data packets 410, 414 may be multiplexed together over the first radio link 406. AT command packets 408, 412 and audio data packets 410, 414 may be sent from the mobile phone 402 to the peripheral device 416 and/or sent from the peripheral device 416 to the mobile phone 402.

In an embodiment, the peripheral device 416 and ear piece 404 may establish a second radio link 418 for exchanging call control commands, such as AT command packet 412, and audio data, such as audio data packets 410, 414. In an embodiment, the second radio link 418 may be a standard Bluetooth® link as defined by the Bluetooth® Hands-Free Profile, including both a call control (i.e., service) connection for exchanging call control commands, such as AT command packet 412, and an audio connection for exchanging audio data, such as audio data packets 410, 414. In an embodiment, the AT command packets 412 and the audio data packets 410, 414 may be multiplexed together over the second radio link 418. AT command packet 412 and audio data packets 410, 414 may be sent from the peripheral device 416 to the ear piece 404 and/or sent from the ear piece 404 to the peripheral device 416.

In an embodiment, the peripheral device 416 may receive the AT command packets 408, 412 and audio data packets 410, 414 from the mobile phone 402 and may separate the AT command packets 408, 412 from the audio data packets 410, 414. As an example, the peripheral device 416 may separate call control commands from audio data by de-multiplex the AT command packets 408, 412 from the audio data packets 410, 414. In an embodiment, the peripheral device 416 may consume all or a portion of the AT command packets 408, 412, for example, for example, by utilizing the AT command packets 408, 412 to indicate on a display of the peripheral device 416 that a voice call has been established. In a further embodiment, the peripheral device 416 may modify one or more of the mobile phone originated call control commands, for example by changing an AT command packet 412, and may combine the modified call control command with the mobile phone originated audio data, for example by multiplexing the modified AT command packet 412 with the audio data packets 410, 414. The peripheral device 416 may send the modified AT command packet 412 and the audio data packets 410, 414 to the ear piece via the second radio link 418. The ear piece 404 may receive the AT command packet 412, and audio data packets 410, 414 and may consume the modified AT command packet 412, for example, by utilizing the modified AT command packet 412 to generate an audible ring indication from a speaker of the ear piece 404. The ear piece 404 may consume the audio data packets 410, 414 by utilizing the audio data packets 410, 414 to output audio on a speaker of the ear piece 404.

In an embodiment, the ear piece 404 may generate call control commands, such as AT command packet 412. As an example a call control command generated by the ear piece 404 may include a hang-up command corresponding to a button press event on the ear piece 404. Additionally, the ear piece 404 may generate audio data, such as audio data packets 410, 414. In an embodiment, the ear piece 404 may send the ear piece 404 originated call control commands, such as AT command packet 412, and the ear piece 404 originated audio data, such as audio data packets 410, 414 to the peripheral device 416 via the second radio link 416. As an example, the ear piece 404 may send the ear piece originated AT command packet 412 and audio data packets 410, 414 to the peripheral device 416 via the second radio link 418 by multiplexing the ear piece 404 originated AT command packet 412 with ear piece originated audio data packets 410, 414 sent over the standard Bluetooth® link as defined by the Bluetooth® Hands-Free Profile. The peripheral device 416 may receive the ear piece 404 originated AT command packet 412 and audio data packets 410, 414. In an embodiment, the peripheral device 416 may validate the AT command packet 412 received from the ear piece 404 to ensure call control command is not a duplicate of a call control command already sent by the peripheral device 416 to the mobile phone 402. As an example, a user may erroneously press a button on an ear piece 404 indicating to answer a call even though the user already indicated to answer a call via the touch screen display of the peripheral device 416. The validation preventing the second call control command received from the ear piece 404 from being forwarded to the mobile phone 402, may prevent duplicate or conflicting call control commands from being received at the mobile phone 402. The peripheral device 416 may generate call control commands, and valid call control commands originated by the peripheral device 416 and or the ear piece 404, such as AT command packets 408, 412, may be sent along with audio data originated by the ear piece 404, such as audio data packets 410, 414 to the mobile phone 402 via the first radio link 406. As an example, the peripheral device 416 may send the valid call control commands originated by the peripheral device 416 and or the ear piece 404, such as AT command packets 408, 412 and audio data originated by the ear piece 404, such as audio data packets 410, 414 to the mobile phone 402 via the first radio link 406 by multiplexing the valid AT command packets 408, 412 with ear piece originated audio data packets 410, 414 sent over the standard Bluetooth® link as defined by the Bluetooth® Hands-Free Profile.

Figure 5:
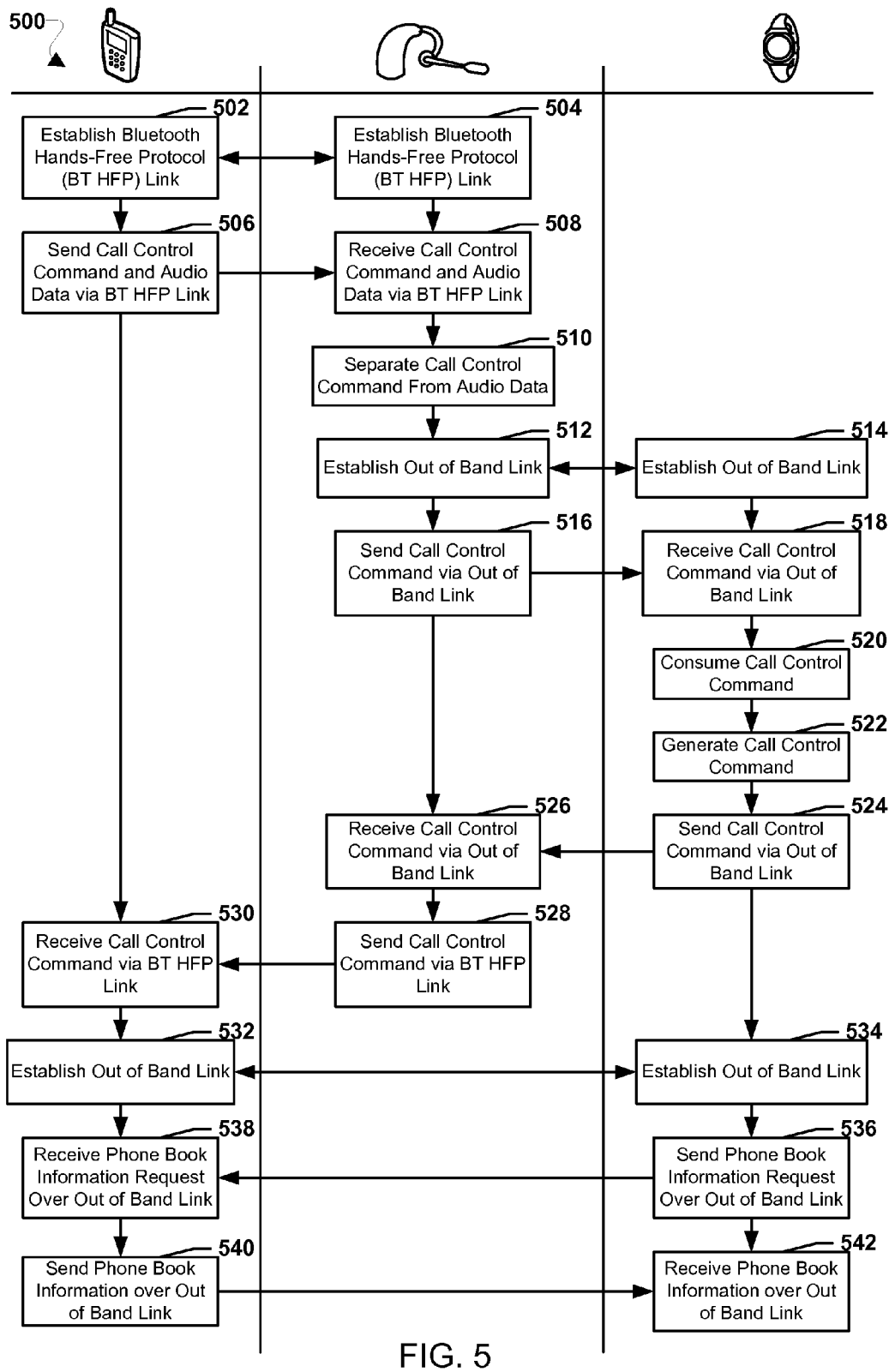
FIG. 5 is a process flow diagram illustrating an embodiment method for providing call control information from a mobile phone to another device.

FIG. 5 illustrates an embodiment method 500 for providing call control information from a mobile phone to another device. In an embodiment, the operations of method 500 may be performed by the processors of devices in a multiple subscriber device system, such as a multiple subscriber device system including a mobile phone, ear piece, and peripheral device, such as a personal hub. In blocks 502 and 504 the mobile phone and ear piece may perform operations to establish a standard Bluetooth® link as defined by the Bluetooth® Hands-Free Protocol ("BT HFP"), including both a service level connection for exchanging call control commands and an audio connection for exchanging audio data. In block 506 the mobile phone may send call control command and audio data via the BT HFP link to the ear piece, and in block 508 the ear piece may receive the call control command and audio data via the BT HFP link. In an embodiment, the call control commands and the audio data may be sent via the BT HFP link as multiplexed packets. In block 510 the ear piece may separate the call control commands from the audio data. In an embodiment, the ear piece may separate the call control commands from the audio data by de-multiplexing the call control commands from the audio data.

At blocks 512 and 514 the ear piece and peripheral device may perform operations to establish an out of band link. In an embodiment, the out of band link established between the ear piece and the peripheral device may be a radio link not established according to the Bluetooth® Hands-Free Profile, such as a separate Bluetooth® link, Peanut, Wi-Fi, ANT+, or other radio link not established according to the Bluetooth® Hands-Free Profile. In block 516 the ear piece may send the call control command received from the mobile phone to the peripheral device via the out of band link, and in block 518 the peripheral device may receive the call control command via the out of band link. In block 520 the peripheral device may consume the call control command. As an example, the peripheral device may consume the call control command by utilizing the call control command packets to indicate on a display of the peripheral device that a voice call has been established.

At block 522 the peripheral device may generate a call control command. As an example, a call control command may be a hang up command generated in response to an indication of a user selection of a terminate call option at the peripheral device. In block 524 the peripheral device may send the call control command originated at the peripheral device to the ear piece via the out of band link, and in block 526 the ear phone may receive the peripheral device originated call control command via the out of band link. In block 528 the ear piece may send the peripheral device originated call control command to the mobile phone via the BT HFP link, and in block 530 the mobile phone may receive the peripheral device originated call control command via the BT HFP link.

At blocks 532 and 534 the mobile phone and peripheral device may perform operations to establish an out of band link between the mobile phone and the peripheral device. In an embodiment, the out of band link established between the mobile phone and the peripheral device may be a radio link not established according to the Bluetooth® Hands-Free Profile, such as a separate Bluetooth® link, Peanut, Wi-Fi, ANT+, or other radio link not established according to the Bluetooth® Hands-Free Profile. As an example, the out of band link established between the mobile phone and the peripheral device may be a Bluetooth® link established according to the Bluetooth® Phone Book Access Profile. In an embodiment, the out of band link may be established between the mobile phone and peripheral device at anytime, such as before the BT HFP link is established between the mobile phone and ear piece, simultaneously with the establishment of the BT HFP, or after the establishment of the BT HFP. In block 536 the peripheral device may send a phone book information request to the mobile phone over the out of band link, and in block 538 the mobile phone may receive the phone book information request over the out of band link. In block 540 the mobile phone may send phone book information over the out of band link, and in block 542 the peripheral device may receive the phone book information over the out of band link from the mobile phone. As examples, phone book information may include phone numbers, contact information, call history information, etc. In the various embodiments, phone book information may be used by the device receiving the phone book information in any manner, such as to match incoming phone numbers with contact information and/or to match selected contacts with phone numbers for dialing outgoing calls.

Figure 6:
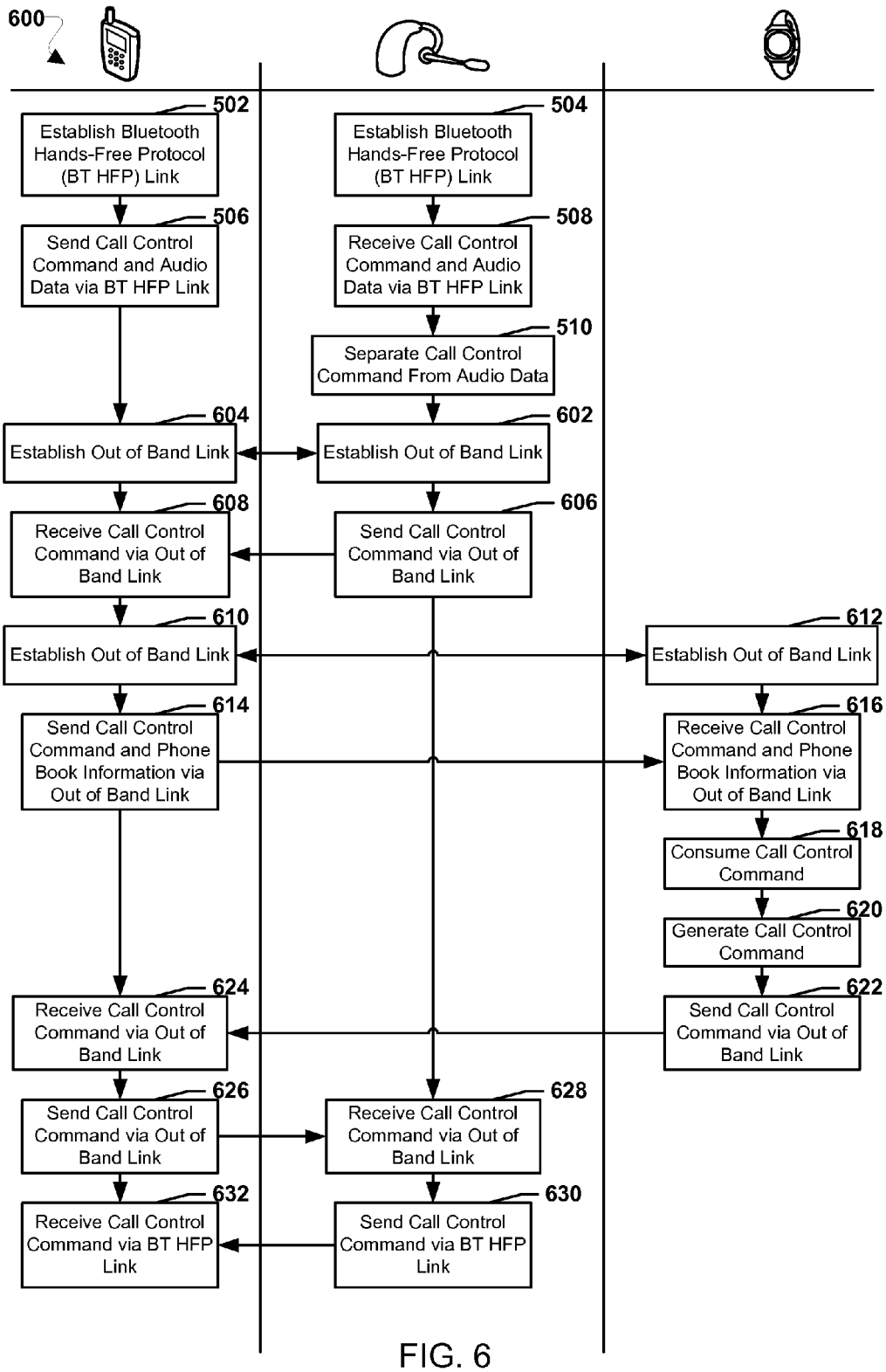
FIG. 6 is a process flow diagram illustrating a second embodiment method for providing call control information from a mobile phone to another device.

FIG. 6 illustrates an embodiment method 600 for providing call control information from a mobile phone to another device similar to method 500 described above with reference to FIG. 5, except that in method 600 an out of band link between the ear piece and peripheral device may not be established. Rather, in method 600 call control information is routed from the ear piece, back through the mobile phone, and then to the peripheral device. In blocks 502, 504, 506, 508, and 510 the mobile phone and ear piece perform operations of like numbered blocks of method 500 described above with reference to FIG. 5 to establish a BT HFP link, send and receive call control commands and audio data via the BT HFP link, and separate the call control commands from the audio data.

At blocks 602 and 604 the ear piece and mobile device may perform operations to establish an out of band link between the ear piece and the mobile device. In an embodiment, the out of band link established between the ear piece and the mobile phone may be a radio link not established according to the Bluetooth® Hands-Free Profile, such as a separate Bluetooth® link, Peanut, Wi-Fi, ANT+, or other radio link not established according to the Bluetooth® Hands-Free Profile. In block 606 the ear piece may send the mobile phone originated call control command to the mobile phone via the out of band link between the ear piece and mobile phone. In block 608 the mobile phone may receive the mobile phone originated call control command via the out of band link between the ear piece and mobile phone. In an embodiment, the call control command may be received in a hub application running on a processor of the mobile device.

At blocks 610 and 612 the mobile phone and peripheral device may perform operations to establish an out of band link between the mobile phone and the peripheral device. In an embodiment, the out of band link established between the mobile phone and the peripheral device may be a radio link not established according to the Bluetooth® Hands-Free Profile, such as a separate Bluetooth® link, Peanut, Wi-Fi, ANT+, or other radio link not established according to the Bluetooth® Hands-Free Profile. In block 614 the mobile phone may send the call control command to the peripheral device via the out of band link between the mobile phone and the peripheral device. In an embodiment, phone book information may also be sent to the peripheral device via the out of band link between the mobile phone and the peripheral device. In block 616 the peripheral device may receive the call control command and phone book information from the mobile phone via the out of band link. In block 618 the peripheral device may consume the call control command. As an example, the peripheral device may consume the call control command by utilizing the call control command packets to indicate on a display of the peripheral device that a voice call has been established.

At block 620 the peripheral device may generate a call control command. As an example, a call control command may be a hang up command generated in response to an indication of a user selection of a terminate call option at the peripheral device. In block 622 the peripheral device may send the call control command originated at the peripheral device to the mobile device via the out of band link between the peripheral device and the mobile device. In block 624 the mobile device may receive the peripheral device originated call control command from the peripheral device via the out of band link. In an embodiment, the peripheral device originated call control command may be received at a hub application running on a processor of the mobile device. In block 626 the mobile device may send the peripheral device originated call control information to the ear piece via the out of band link between the mobile device and ear piece. In block 628 the ear piece may receive the peripheral device originated call control command from the mobile device via the out of band link between the mobile device and ear piece. In block 630 the ear piece may send the peripheral device originated call control command to the mobile phone via the BT HFP link, and in block 632 the mobile phone may receive the peripheral device originated call control command via the BT HFP link.

Figure 7:
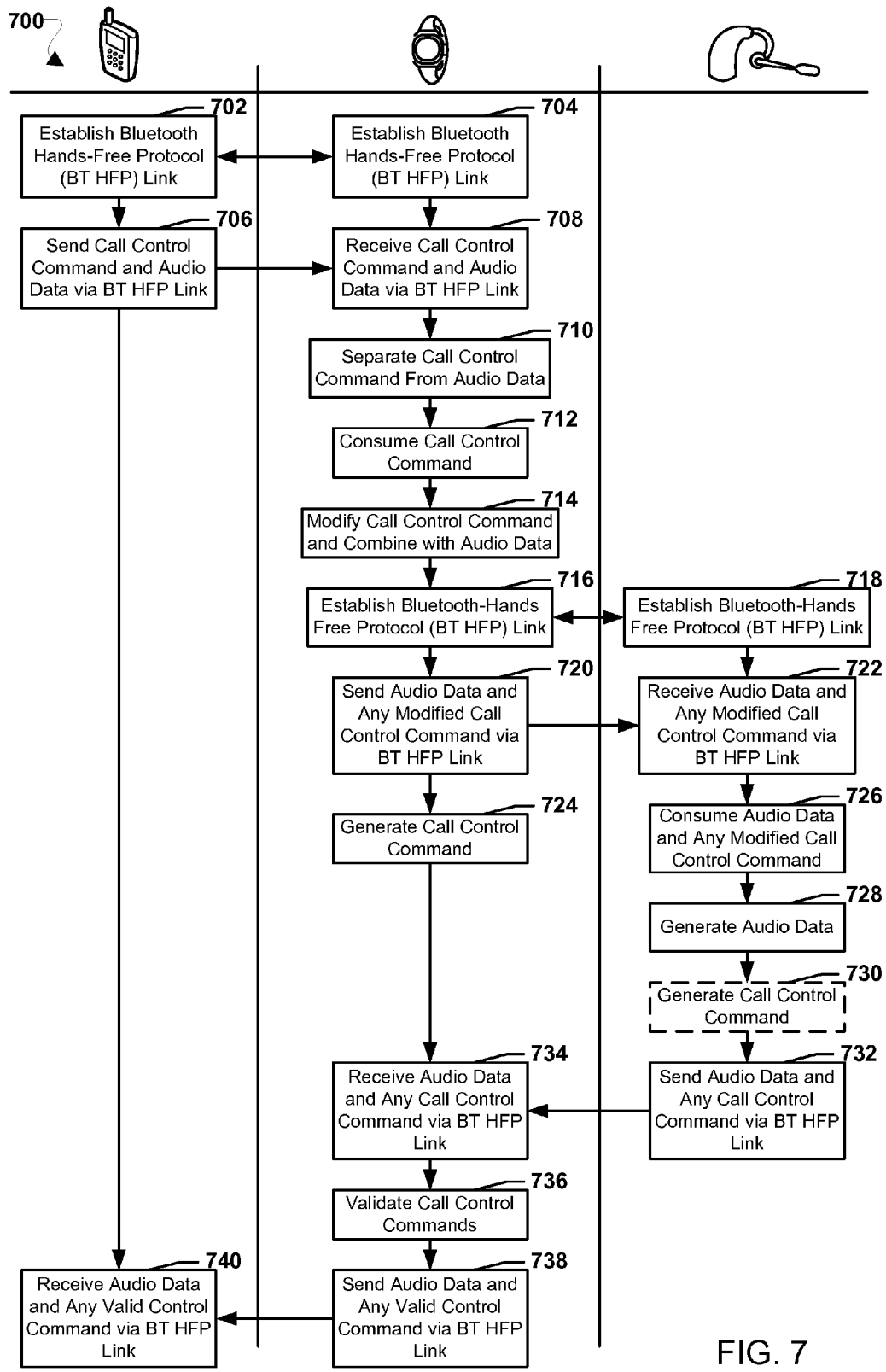
FIG. 7 is a process flow diagram illustrating a third embodiment method for providing call control information from a mobile phone to another device.

FIG. 7 illustrates an embodiment method 700 for providing call control information from a mobile phone to another device. In an embodiment, the operations of method 700 may be performed by the processors of devices in a multiple subscriber device system, such as a multiple subscriber device system including a mobile phone, ear piece, and peripheral device, such as a personal hub. In blocks 702 and 704 the mobile phone and peripheral device may perform operations to establish a standard Bluetooth® link as defined by the Bluetooth® Hands-Free Protocol ("BT HFP"), including both a service level connection for exchanging call control commands and an audio connection for exchanging audio data. In block 706 the mobile phone may send call control command and audio data via the BT HFP link to the peripheral device, and in block 708 the peripheral device may receive the call control command and audio data via the BT HFP link. In an embodiment, the call control commands and the audio data may be sent via the BT HFP link as multiplexed packets. In block 710 the peripheral device may separate the call control commands from the audio data. In an embodiment, the peripheral device may separate the call control commands from the audio data by de-multiplexing the call control commands from the audio data. In block 712 the peripheral device may consume the call control command. As an example, the peripheral device may consume the call control command by utilizing the call control command packets to indicate on a display of the peripheral device that a voice call has been established. In block 714 the peripheral device may modify a call control command and combine the modified call control command with the mobile phone originated audio data. As an example, the peripheral device may combine the modified call control command and the mobile phone originated audio data by multiplexing the modified call control command and mobile phone originated audio data.

At blocks 716 and 718 the peripheral device and ear piece may perform operations to establish a standard Bluetooth® link as defined by the Bluetooth® Hands-Free Protocol ("BT HFP"), including both a service level connection for exchanging call control commands and an audio connection for exchanging audio data. In block 720 the peripheral device may send audio data and any modified call control command via the BT HFP link to the ear piece, and in block 722 the peripheral device may receive the audio data and any modified call control command via the BT HFP link. In an embodiment, the modified call control commands and the audio data may be sent via the BT HFP link as multiplexed packets. In block 726 the ear piece may consume the audio data and any modified call control command. As an example, the ear piece may consume the audio data by outputting sound from a speaker using the audio data and may consume the modified call control command by outputting a ring indication from a speaker of the ear piece.

At block 724 the peripheral device may generate a call control command. As an example, a call control command may be a hang up command generated in response to an indication of a user selection of a terminate call option at the peripheral device. In parallel, in block 728 the ear piece may generate audio data, such as voice data received from a microphone of the ear piece. In an optional embodiment, at optional block 730 the ear piece may also generate a call control command. As an example, a call control command may be a hang up command generated in response to a button press indication at the ear piece. In block 732 the ear piece may send the ear piece originated audio data and any call control command to the peripheral device via the BT HFP link between the ear piece and the peripheral device. In block 734 the peripheral device may receive the audio data and any call control command received from the ear piece via the BT HFP link between the peripheral device and ear piece. In block 736 the peripheral device may validate the call control commands. In an embodiment, validating call control commands may include comparing call commands generated by the peripheral device and received call control commands originated by the ear piece to call control commands previously sent by the peripheral device to the mobile phone. As an example, the peripheral device may log the type of call control commands sent to the mobile device, and may prevent duplicate or conflicting call control commands from being sent to the mobile phone. In block 738 the peripheral device may send the ear piece originated audio data and any valid call control commands to the mobile phone via the BT HFP link, and in block 740 the mobile phone may receive the ear piece originated audio data and any valid call control commands via the BT HFP link.

Figure 8:
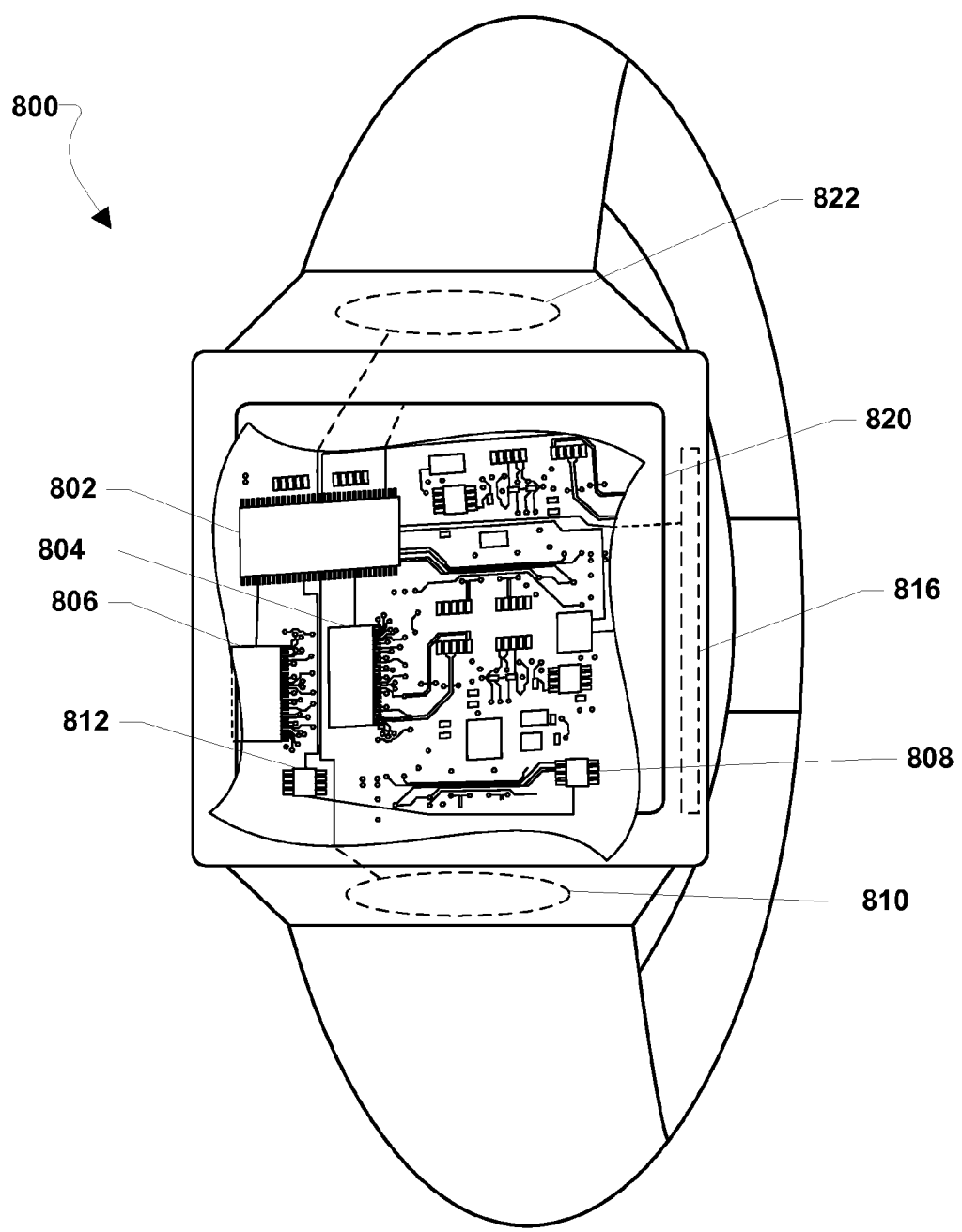
FIG. 8 is a component diagram of an example personal hub suitable for use with the various embodiments.

The various embodiments described above may be implemented within a variety of peripheral devices, such as personal hubs. FIG. 8 illustrates an example peripheral device, a wrist watch type personal hub 800. A personal hub 800 may include a processor 802 coupled to internal memories 804 and 806. Internal memories 804 and 806 may be volatile or non-volatile memories, and may also be secure and/or encrypted memories, or unsecure and/or unencrypted memories, or any combination thereof. The processor 802 may also be coupled to a touch screen display 820, such as a resistive-sensing touch screen, capacitive-sensing touch screen infrared sensing touch screen, or the like. Additionally, the personal hub 800 may have one or more antenna 808 for sending and receiving electromagnetic radiation that may be connected to one or more wireless data links 812, such as one or more Bluetooth® transceivers, Peanut transceivers, Wi-Fi transceivers, ANT+ transceivers, etc., which may be coupled to the processor 802. The personal hub 800 may also include physical buttons 822 and 810 for receiving user inputs as well as a slide sensor 816 for receiving user inputs.

Figure 9:
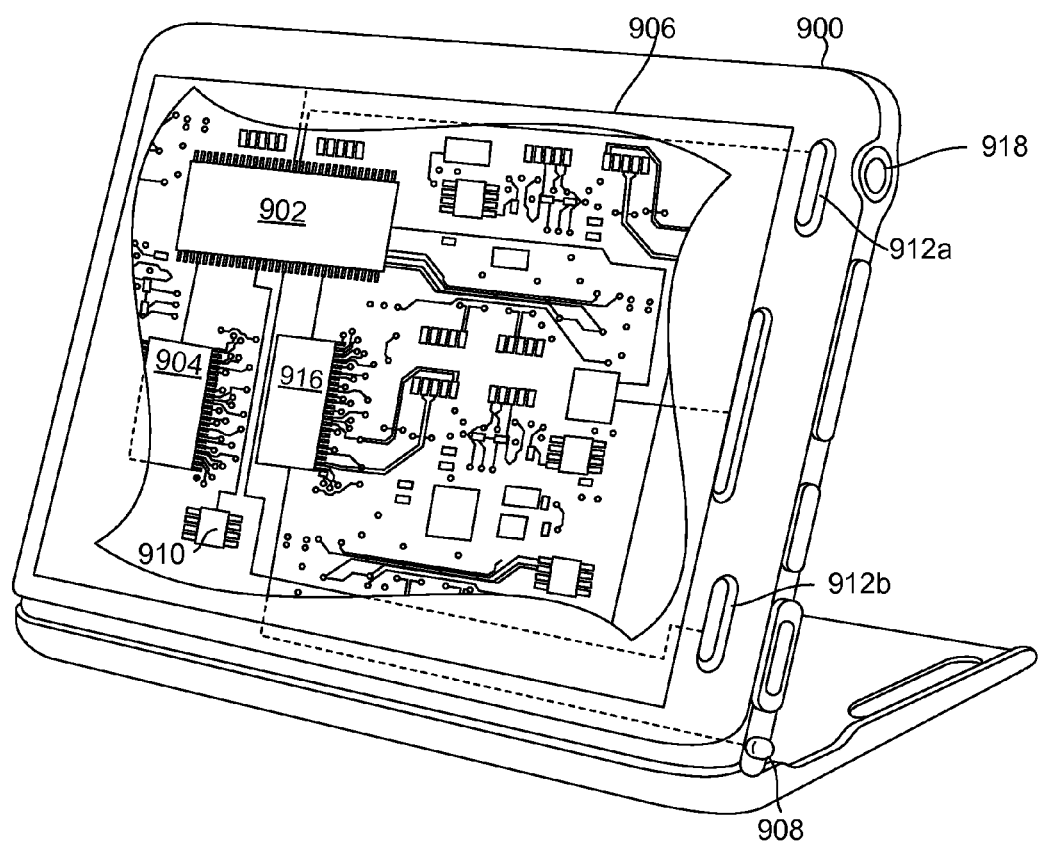
FIG. 9 is a component diagram of an example mobile device suitable for use with the various embodiments.

The various embodiments may be implemented in any of a variety of mobile telephones, an example of which is illustrated in FIG. 9. For example, the mobile device 900 may include a processor 902 coupled to internal memories 904 and 910. Internal memories 904 and 910 may be volatile or non-volatile memories, and may also be secure and/or encrypted memories, or unsecure and/or unencrypted memories, or any combination thereof. The processor 902 may also be coupled to a touch screen display 906, such as a resistive-sensing touch screen, capacitive-sensing touch screen infrared sensing touch screen, or the like. Additionally, the display of the mobile device 900 need not have touch screen capability. Additionally, the mobile device 900 may have one or more antenna 908 for sending and receiving electromagnetic radiation that may be connected to one or more wireless data links and/or cellular telephone transceivers 916, such as one or more Bluetooth® transceivers, Peanut transceivers, Wi-Fi transceivers, ANT+ transceivers, cellular (e.g., CDMA, TDMA, GSM, PCS, 3G, 4G, LTE, etc.) transceivers, etc., which may be coupled to the processor 902. The mobile device 900 may also include physical buttons 912a and 912b for receiving user inputs. The mobile device 900 may also include a power button 918 for turning the mobile device 900 on and off.

Figure 10A:
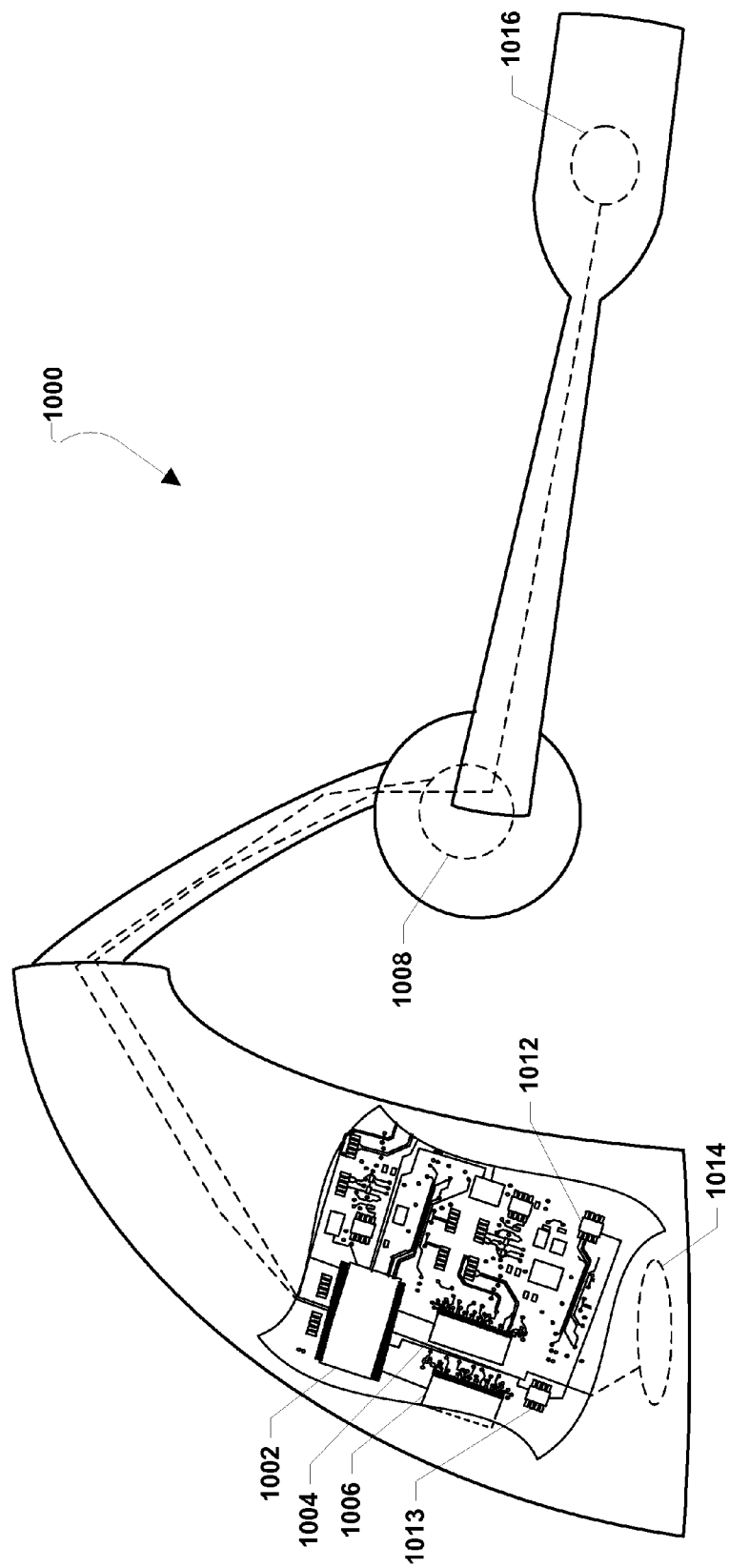
FIGS. 10A and 10B are component diagrams of example wireless earpieces suitable for use with the various embodiments.

The various embodiments described above may also be implemented within a variety of wireless earpieces, such as wireless earpiece 1000 illustrated in FIG. 10A. A wireless earpiece 1000 may include a processor 1002 coupled to internal memories 1004 and 1006. Internal memories 1004 and 1006 may be volatile or non-volatile memories, and may also be secure and/or encrypted memories, or unsecure and/or unencrypted memories, or any combination thereof. The wireless earpiece 1000 may include a physical button 1014 for receiving user inputs. Additionally, the wireless earpiece 1000 may have one or more antenna 1012 for sending and receiving electromagnetic radiation that may be connected to a wireless data link 1013 such as one or more Bluetooth® transceivers, Peanut transceivers, Wi-Fi transceivers, ANT+ transceivers, etc., which may be coupled to the processor 1002. The wireless earpiece 1000 may include a speaker 1008 coupled to the processor 1002 and configured to generate an audio output. The wireless earpiece 1000 may also include a microphone 1016 coupled to the processor 1002 to receive an audio input.

Figure 10B:
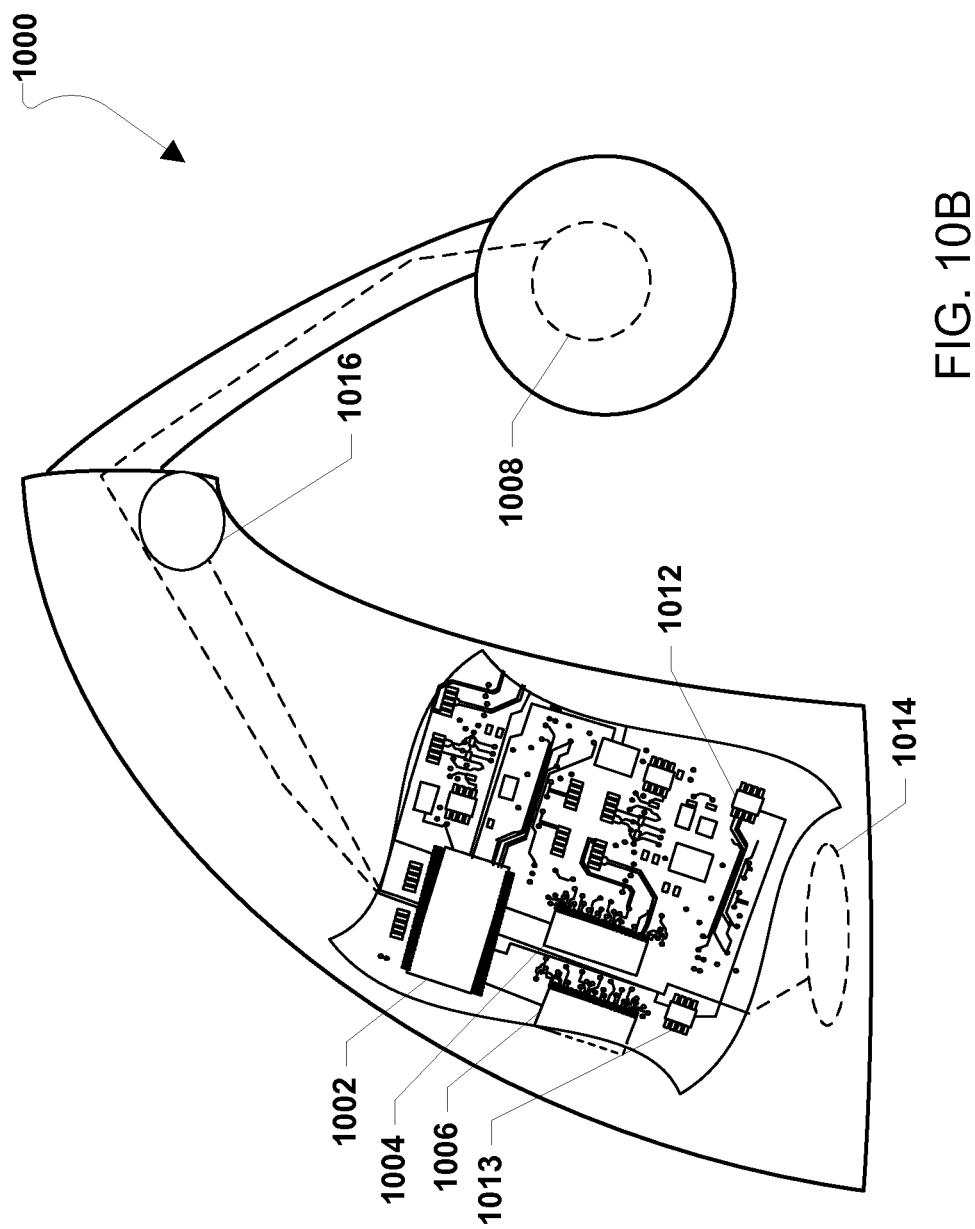

FIG. 10B illustrates an alternative embodiment of the wireless earpiece 1000 in which the microphone 1016 may be positioned within a main housing of the wireless earpiece 1000 rather than on a microphone boom extending toward the user's mouth when the wireless earpiece is worn. In an embodiment, the microphone 1016 may be a directional microphone, and the earpiece housing may be configured such that the microphone 1016 is pointed toward the mouth of the user when the user may be wearing the earpiece 1016. Further audio processing of microphone data may be used to further direct the microphone sensitivity in order to capture audio data from the user's mouth. In this manner, the microphone 1016 may receive audio input from the user of the wireless earpiece 1016.

The processors 802, 902, and 1002 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 804, 806, 904, 910, 1004, and 1006 before they are accessed and loaded into the processors 802, 902, and 1002. The processors 802, 802, and 1002 may include internal memory sufficient to store the application software instructions. In many devices the internal memory may be a volatile or nonvolatile memory, such as flash memory, or a mixture of both. For the purposes of this description, a general reference to memory refers to memory accessible by the processors 802, 902, and 1002 including internal memory or removable memory plugged into the device and memory within the processor 802, 902, and 1002 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a call on a communication device, comprising:
   receiving a mobile phone originated call control command and audio data from a mobile phone at the communication device via a first radio link; and
   separating the mobile phone originated call control command from the audio data at the communication device.

2. The method of claim 1, further comprising establishing the first radio link between the mobile phone and the communication device, wherein the first radio link is a first Bluetooth® link including a call control connection and a first audio connection.

3. The method of claim 2, wherein the communication device is an ear piece, the method further comprising:
   establishing a first out of band link between the ear piece and a peripheral device; and
   sending the received mobile phone originated call control command from the ear piece to the peripheral device via the first out of band link.

4. The method of claim 3, further comprising:
   receiving a peripheral device originated call control command at the ear piece via the first out of band link; and
   sending the peripheral device originated call control command from the ear piece to the mobile phone via the first Bluetooth® link.

5. The method of claim 4, wherein the first out of band link is a second Bluetooth® link.

6. The method of claim 4, further comprising:
   establishing a second out of band link between the mobile phone and the peripheral device; and
   sending phonebook information from the mobile phone to the peripheral device over the second out of band link.

7. The method of claim 2, wherein the communication device is an ear piece, the method further comprising:
   establishing a first out of band link between the ear piece and the mobile phone;
   establishing a second out of band link between the mobile phone and a peripheral device;
   sending the received mobile phone originated call control command from the ear piece to the mobile phone via the first out of band link;
   receiving the mobile phone originated call control command sent from the ear piece in a hub application resident on the mobile phone;
   sending the mobile phone originated call control command from the hub application to the peripheral device via the second out of band link; and
   receiving the mobile phone originated call control command sent from the hub application at the peripheral device.

8. The method of claim 7, further comprising:
   receiving a peripheral device originated call control command in the hub application resident on the mobile phone via the second out of band link;
   sending the peripheral device originated call control command from the hub application to the ear piece via the first out of band link;
   receiving the peripheral device originated call control command at the ear piece via the first out of band link; and
   sending the peripheral device originated call control command from the ear piece to the mobile phone via the first Bluetooth® link.

9. The method of claim 7, wherein the peripheral device is a wireless personal hub, the first out of band link is a second Bluetooth® link, and the second out of band link is a third Bluetooth® link.

10. The method of claim 7, further comprising:
    sending phonebook information from the mobile phone to the peripheral device over the second out of band link.

11. The method of claim 2, wherein the communication device is a peripheral device, the method further comprising:
    establishing a second Bluetooth® link between the peripheral device and an ear piece, the second Bluetooth® link including a call control connection and a second audio connection between the ear piece and the peripheral device; and
    sending the mobile phone originated audio data from the peripheral device to the ear piece via the second Bluetooth® link.

12. The method of claim 11, further comprising:
    receiving ear piece originated call control command and audio data from the ear piece at the peripheral device via the second Bluetooth® link;
    sending the ear piece originated call control command and audio data from the peripheral device to the mobile phone over the first audio connection over the first Bluetooth® link; and
    receiving the ear piece originated call control command and audio data at the mobile phone via the first Bluetooth® link.

13. The method of claim 11, further comprising:
    modifying the mobile phone originated call control command at the peripheral device to generate a modified call control command; and
    combining the modified call control command and the mobile phone originated audio data at the peripheral device,
    wherein sending the mobile phone originated audio data from the peripheral device to the ear piece via the second Bluetooth® link comprises sending the modified call control command and the mobile phone originated audio data to the ear piece via the second Bluetooth® link.

14. A communication device, comprising:
   a transceiver;
   a memory; and
   a processor connected to the transceiver and the memory, wherein the processor is configured with processor-executable instructions to perform operations comprising:

receiving a mobile phone originated call control command and audio data from a mobile phone via a first radio link; and separating the mobile phone originated call control command from the audio data.

15. The communication device of claim 14, further comprising establishing the first radio link with a mobile phone, wherein the first radio link is a first Bluetooth® link including a call control connection and a first audio connection.

16. The communication device of claim 15, wherein the communication device is an ear piece, and wherein the processor is configured with processor-executable instructions to perform operations further comprising:

establishing a first out of band link with a peripheral device; and sending the received mobile phone originated call control command to the peripheral device via the first out of band link.

17. The communication device of claim 16, wherein the processor is configured with processor-executable instructions to perform operations further comprising:

receiving a peripheral device originated call control command via the first out of band link; and sending the peripheral device originated call control command to the mobile phone via the first Bluetooth® link.

18. The communication device of claim 17, wherein the first out of band link is a second Bluetooth® link.

19. The communication device of claim 15, wherein the communication device is a peripheral device, and wherein the processor is configured with processor-executable instructions to perform operations further comprising:

establishing a second Bluetooth® link with an ear piece, the second Bluetooth® link including a call control connection and a second audio connection between the ear piece and the peripheral device; and sending the mobile phone originated audio data to the ear piece via the second Bluetooth® link.

20. The communication device of claim 19, wherein the processor is configured with processor-executable instructions to perform operations further comprising:

receiving ear piece originated call control command and audio data from the ear piece via the second Bluetooth® link; and sending the ear piece originated call control command and audio data to the mobile phone over the first audio connection over the first Bluetooth® link.

21. The communication device of claim 19, wherein the processor is configured with processor-executable instructions to perform operations further comprising:

modifying the mobile phone originated call control command to generate a modified call control command; and combining the modified call control command and the mobile phone originated audio data, and wherein the processor is configured with processor-executable instructions to perform operations such that sending the mobile phone originated audio data to the ear piece via the second Bluetooth® link comprises sending the modified call control command and the mobile phone originated audio data to the ear piece via the second Bluetooth® link.

22. A communication device, comprising:

means for receiving a mobile phone originated call control command and audio data from a mobile phone via a first radio link; and means for separating the mobile phone originated call control command from the audio data.

23. The communication device of claim 22, further comprising means for establishing the first radio link with a mobile phone, wherein the first radio link is a first Bluetooth® link including a call control connection and a first audio connection.

24. The communication device of claim 23, wherein the communication device is an ear piece, the communication device further comprising:

means for establishing a first out of band link with a peripheral device; and means for sending the received mobile phone originated call control command to the peripheral device via the first out of band link.

25. The communication device of claim 24, further comprising:

means for receiving a peripheral device originated call control command via the first out of band link; and means for sending the peripheral device originated call control command to the mobile phone via the first Bluetooth® link.

26. The communication device of claim 25, wherein the first out of band link is a second Bluetooth® link.

27. The communication device of claim 23, wherein the communication device is a peripheral device, the communication device further comprising:

means for establishing a second Bluetooth® link with an ear piece, the second Bluetooth® link including a call control connection and a second audio connection between the ear piece and the peripheral device; and means for sending the mobile phone originated audio data to the ear piece via the second Bluetooth® link.

28. The communication device of claim 27, further comprising:

means for receiving ear piece originated call control command and audio data from the ear piece via the second Bluetooth® link; and means for sending the ear piece originated call control command and audio data to the mobile phone over the first audio connection over the first Bluetooth® link.

29. The communication device of claim 27, further comprising:

means for modifying the mobile phone originated call control command to generate a modified call control command; and means for combining the modified call control command and the mobile phone originated audio data, and wherein means for sending the mobile phone originated audio data to the ear piece via the second Bluetooth® link comprises means for sending the modified call control command and the mobile phone originated audio data to the ear piece via the second Bluetooth® link.

30. A non-transitory processor-readable storage medium having stored thereon processor-executable instructions configured to cause a processor of a communication device to perform operations comprising:

receiving a mobile phone originated call control command and audio data from a mobile phone via a first radio link; and separating the mobile phone originated call control command from the audio data.

31. The non-transitory processor-readable storage medium of claim 30, wherein:

the stored processor-executable instructions are configured to cause a processor of the communication device to perform operations further comprising establishing the first radio link with the mobile phone; and the stored processor-executable instructions are configured to cause a processor of the communication device to perform operations such that the first radio link is a first Bluetooth® link including a call control connection and a first audio connection.

32. The non-transitory processor-readable storage medium of claim 31, wherein the communication device is an ear piece, and wherein the stored processor-executable instructions are configured to cause a processor of an ear piece to perform operations further comprising:

establishing a first out of band link with a peripheral device; and sending the received mobile phone originated call control command to the peripheral device via the first out of band link.

33. The non-transitory processor-readable storage medium of claim 32, wherein the stored processor-executable instructions are configured to cause a processor of an ear piece to perform operations further comprising:

receiving a peripheral device originated call control command via the first out of band link; and sending the peripheral device originated call control command to the mobile phone via the first Bluetooth® link.

34. The non-transitory processor-readable storage medium of claim 32, wherein the stored processor-executable instructions are configured to cause a processor of an ear piece to perform operations such that the first out of band link is a second Bluetooth® link.

35. The non-transitory processor-readable storage medium of claim 31, wherein the communication device is a peripheral device, wherein the stored processor-executable instructions are configured to cause a processor of a peripheral device to perform operations further comprising:

establishing a second Bluetooth® link with an ear piece, the second Bluetooth® link including a call control connection and a second audio connection between the ear piece and the peripheral device; and sending the mobile phone originated audio data to the ear piece via the second Bluetooth® link.

36. The non-transitory processor-readable storage medium of claim 35, wherein the stored processor-executable instructions are configured to cause a processor of a peripheral device to perform operations further comprising:

receiving ear piece originated call control command and audio data from the ear piece via the second Bluetooth® link; and sending the ear piece originated call control command and audio data to the mobile phone over the first audio connection over the first Bluetooth® link.

37. The non-transitory processor-readable storage medium of claim 35, wherein the stored processor-executable instructions are configured to cause a processor of a peripheral device to perform operations further comprising:

modifying the mobile phone originated call control command to generate a modified call control command; and combining the modified call control command and the mobile phone originated audio data, and wherein the stored processor-executable instructions are configured to cause a processor of a peripheral device to perform operations such that sending the mobile phone originated audio data to the ear piece via the second Bluetooth® link comprises sending the modified call control command and the mobile phone originated audio data to the ear piece via the second Bluetooth® link.

38. A communication system, comprising:

a mobile phone, comprising:
a first transceiver;
a first memory; and
a first processor connected to the first transceiver and the first memory; and a communication device, comprising:
a second transceiver;
a second memory; and
a second processor connected to the second transceiver and the second memory, wherein the first processor is configured with processor-executable instructions to perform operations comprising:

establishing a first radio link with the communication device; and sending a mobile phone originated call control command and audio data to the communication device via the first radio link, and wherein the second processor is configured with processor-executable instructions to perform operations comprising:

establishing the first radio link with the mobile phone;

receiving the mobile phone originated call control command and audio data from the mobile phone via the first radio link; and separating the mobile phone originated call control command from the audio data.

39. The communication system of claim 38, wherein the first radio link is a first Bluetooth® link including a call control connection and a first audio connection.

40. The communication system of claim 39, wherein the communication device is an ear piece, the communication system further comprising:

a peripheral device, comprising:
a third transceiver;
a third memory; and
a third processor connected to the third transceiver and the third memory, wherein the second processor is configured with processor-executable instructions to perform operations further comprising:

establishing a first out of band link with the peripheral device; and sending the received mobile phone originated call control command to the peripheral device via the first out of band link, and wherein the third processor is configured with processor-executable instructions to perform operations comprising:

establishing the first out of band link with the ear piece; and receiving the mobile phone originated call control command from the ear piece via the first out of band link.

41. The communication system of claim 40, wherein:

the third processor is configured with processor-executable instructions to perform operations further comprising sending a peripheral device originated call control command to the ear piece via the first out of band link;

the second processor is configured with processor-executable instructions to perform operations further comprising:

receiving the peripheral device originated call control command from the peripheral device via the first out of band link; and sending the peripheral device originated call control command to the mobile phone via the first Bluetooth® link; and the first processor is configured with processor-executable instructions to perform operations further comprising receiving the peripheral device originated call control command from the ear piece via the first Bluetooth® link.

42. The communication system of claim 41, wherein the first out of band link is a second Bluetooth® link.

43. The communication system of claim 41, wherein:
the first processor is configured with processor-executable instructions to perform operations further comprising:
establishing a second out of band link with the peripheral device; and
sending phonebook information to the peripheral device over the second out of band link, and
the third processor is configured with processor-executable instructions to perform operations further comprising:
establishing the second out of band link with the mobile phone; and
receiving phonebook information from the mobile phone over the second out of band link.

44. The communication system of claim 39, wherein the communication device is an ear piece, the communication system further comprising:
a peripheral device, comprising:
a third transceiver;
a third memory; and
a third processor connected to the third transceiver and the third memory,
wherein the second processor is configured with processor-executable instructions to perform operations further comprising:
establishing a first out of band link with the mobile phone; and
sending the received mobile phone originated call control command to the mobile phone via the first out of band link,
wherein the first processor is configured with processor-executable instructions to perform operations further comprising:
establishing the first out of band link with the ear piece;
receiving the mobile phone originated call control command from the ear piece in a hub application;
establishing a second out of band link with the peripheral device; and
sending the mobile phone originated call control command from the hub application to the peripheral device via the second out of band link, and
wherein the third processor is configured with processor-executable instructions to perform operations comprising:
establishing the second out of band link with mobile phone; and
receiving the mobile phone originated call control command sent from the hub application.

45. The communication system of claim 44, wherein:
the third processor is configured with processor-executable instructions to perform operations further comprising:
sending a peripheral device originated call control command to the hub application via the second out of band link;
the first processor is configured with processor-executable instructions to perform operations further comprising:
receiving the peripheral device originated call control command in the hub application resident on the mobile phone via the second out of band link; and
sending the peripheral device originated call control command from the hub application to the ear piece via the first out of band link; and
the second processor is configured with processor-executable instructions to perform operations further comprising:
receiving the peripheral device originated call control command via the first out of band link; and
sending the peripheral device originated call control command to the mobile phone via the first Bluetooth® link.

46. The communication system of claim 44, wherein the peripheral device is a wireless personal hub, the first out of band link is a second Bluetooth® link, and the second out of band link is a third Bluetooth® link.

47. The communication system of claim 44, wherein:
the first processor is configured with processor-executable instructions to perform operations further comprising sending phonebook information to the peripheral device over the second out of band link; and
the second processor is configured with processor-executable instructions to perform operations further comprising receiving the phonebook information over the second out of band link.

48. The communication system of claim 39, wherein the communication device is a peripheral device, the communication system further comprising:
an ear piece, comprising:
a third transceiver;
a third memory; and
a third processor connected to the third transceiver and the third memory,
wherein the second processor is configured with processor-executable instructions to perform operations further comprising:
establishing a second Bluetooth® link with the ear piece, the second Bluetooth® link including a call control connection and a second audio connection between the ear piece and the peripheral device; and
sending the mobile phone originated audio data to the ear piece via the second Bluetooth® link, and
wherein the third processor is configured with processor-executable instructions to perform operations comprising:
establishing the second Bluetooth® link with the peripheral device; and
receiving the mobile phone originated audio data via the second Bluetooth® link.

49. The communication system of claim 48, wherein:
the third processor is configured with processor-executable instructions to perform operations further comprising sending ear piece originated call control command and audio data to the peripheral device via the second Bluetooth® link;
the second processor is configured with processor-executable instructions to perform operations further comprising:
receiving ear piece originated call control command and audio data from the ear piece via the second Bluetooth® link; and
sending the ear piece originated call control command and audio data to the mobile phone over the first audio connection over the first Bluetooth® link; and the first processor is configured with processor-executable instructions to perform operations further comprising receiving the ear piece originated call control command and audio data via the first Bluetooth® link.

50. The communication system of claim 48, wherein the second processor is configured with processor-executable instructions to perform operations further comprising:
   modifying the mobile phone originated call control command to generate a modified call control command; and
   combining the modified call control command and the mobile phone originated audio data, and
   wherein the second processor is configured with processor-executable instructions to perform operations such that sending the mobile phone originated audio data to the ear piece via the second Bluetooth® link comprises sending the modified call control command and the mobile phone originated audio data to the ear piece via the second Bluetooth® link.

51. A communication system for providing call control information from a mobile phone to a communication device, comprising:
   means for establishing a first radio link between the mobile phone and the communication device;
   means for receiving a mobile phone originated call control command and audio data from the mobile phone at the communication device via the first radio link; and
   means for separating the mobile phone originated call control command from the audio data at the communication device.

52. The communication system of claim 51, wherein the first radio link is a first Bluetooth® link including a call control connection and a first audio connection.

53. The communication system of claim 52, wherein the communication device is an ear piece, the communication system further comprising:
   means for establishing a first out of band link between the ear piece and a peripheral device; and
   means for sending the received mobile phone originated call control command from the ear piece to the peripheral device via the first out of band link.

54. The communication system of claim 53, further comprising:
   means for receiving a peripheral device originated call control command at the ear piece via the first out of band link; and
   means for sending the peripheral device originated call control command from the ear piece to the mobile phone via the first Bluetooth® link.

55. The communication system of claim 54, wherein the first out of band link is a second Bluetooth® link.

56. The communication system of claim 54, further comprising:
   means for establishing a second out of band link between the mobile phone and the peripheral device; and
   means for sending phonebook information from the mobile phone to the peripheral device over the second out of band link.

57. The communication system of claim 52, wherein the communication device is an ear piece, the communication system further comprising:
   means for establishing a first out of band link between the ear piece and the mobile phone;
   means for establishing a second out of band link between the mobile phone and a peripheral device;
   means for sending the received mobile phone originated call control command from the ear piece to the mobile phone via the first out of band link;
   means for receiving the mobile phone originated call control command sent from the ear piece in a hub application resident on the mobile phone;
   means for sending the mobile phone originated call control command from the hub application to the peripheral device via the second out of band link; and
   means for receiving the mobile phone originated call control command sent from the hub application at the peripheral device.

58. The communication system of claim 57, further comprising:
   means for receiving a peripheral device originated call control command in the hub application resident on the mobile phone via the second out of band link;
   means for sending the peripheral device originated call control command from the hub application to the ear piece via the first out of band link;
   means for receiving the peripheral device originated call control command at the ear piece via the first out of band link; and
   means for sending the peripheral device originated call control command from the ear piece to the mobile phone via the first Bluetooth® link.

59. The communication system of claim 57, wherein the peripheral device is a wireless personal hub, the first out of band link is a second Bluetooth® link, and the second out of band link is a third Bluetooth® link.

60. The communication system of claim 57, further comprising:
   means for sending phonebook information from the mobile phone to the peripheral device over the second out of band link.

61. The communication system of claim 52, wherein the communication device is a peripheral device, the communication system further comprising:
   means for establishing a second Bluetooth® link between the peripheral device and an ear piece, the second Bluetooth® link including a call control connection and a second audio connection between the ear piece and the peripheral device; and
   means for sending the mobile phone originated audio data from the peripheral device to the ear piece via the second Bluetooth® link.

62. The communication system of claim 61, further comprising:
   means for receiving ear piece originated call control command and audio data from the ear piece at the peripheral device via the second Bluetooth® link;
   means for sending the ear piece originated call control command and audio data from the peripheral device to the mobile phone over the first audio connection over the first Bluetooth® link; and
   means for receiving the ear piece originated call control command and audio data at the mobile phone via the first Bluetooth® link.

63. The communication system of claim 61, further comprising:
   means for modifying the mobile phone originated call control command at the peripheral device to generate a modified call control command; and
   means for combining the modified call control command and the mobile phone originated audio data at the peripheral device,
   wherein means for sending the mobile phone originated audio data from the peripheral device to the ear piece via the second Bluetooth® link comprises means for sending the modified call control command and the mobile phone originated audio data to the ear piece via the second Bluetooth® link.

* * * * *